US007136353B2

United States Patent
Ha et al.

(10) Patent No.: US 7,136,353 B2
(45) Date of Patent: Nov. 14, 2006

(54) QUALITY OF SERVICE MANAGEMENT FOR MULTIPLE CONNECTIONS WITHIN A NETWORK COMMUNICATION SYSTEM

(75) Inventors: Sungwon Ha, Mountain View, CA (US); Sung-wook Han, Sunnyvale, CA (US); Upamanyu Madhow, Santa Barbara, CA (US); Tae-eun Kim, Sunnyvale, CA (US); Constantine Polychronopoulos, Mt. View, CA (US)

(73) Assignee: Bytemobile, Inc., Mountain View, CA (US)

( * ) Notice: Subject to any disclaimer, the term of this patent is extended or adjusted under 35 U.S.C. 154(b) by 945 days.

(21) Appl. No.: 10/150,858

(22) Filed: May 17, 2002

(65) Prior Publication Data
US 2003/0063564 A1  Apr. 3, 2003

Related U.S. Application Data

(60) Provisional application No. 60/309,212, filed on Jul. 31, 2001, provisional application No. 60/291,825, filed on May 18, 2001.

(51) Int. Cl.
*G06F 11/00* (2006.01)
*H04J 1/16* (2006.01)
*H04L 1/00* (2006.01)

(52) U.S. Cl. .................. 370/230; 370/230.1; 370/229; 370/412

(58) Field of Classification Search ................ 370/229, 370/230, 230.1, 231, 232, 233, 234, 235, 370/412, 413, 414, 416, 418
See application file for complete search history.

(56) References Cited

U.S. PATENT DOCUMENTS

| 6,038,216 | A |  | 3/2000 | Packer | ................. | 370/231 |
| 6,076,114 | A |  | 6/2000 | Wesley | ................. | 709/235 |
| 6,105,064 | A |  | 8/2000 | Davis et al. | ............ | 709/224 |
| 6,560,231 | B1 | * | 5/2003 | Kawakami et al. | .... | 370/395.43 |

(Continued)

FOREIGN PATENT DOCUMENTS

EP        0 415 843 A2    3/1991

(Continued)

OTHER PUBLICATIONS

M. Allman, "TCP Congestion Control", IETF FRC, Online! Apr. 1999 XP 002210779, pp. 1-12.

(Continued)

*Primary Examiner*—Steven Nguyen
*Assistant Examiner*—Chuong Ho
(74) *Attorney, Agent, or Firm*—Wilson Sonsini Goodrich & Rosati

(57) ABSTRACT

Improved quality of service management for multiple connections between a sender and a receiver may be achieved by allocating a host-level transmission rate among the multiple connections based on a ratio of a weight associated with each connection and a sum of the weights associated the connections. Data packets associated with the connections may then be selectively transmitted to the receiver such that data packets having a highest difference between the allocated transmission rate and an actual transmission rate are transmitted first. The data packets transmitted to the sender may also be clocked using a transmission timer having period corresponding to the host-level transmission rate.

24 Claims, 11 Drawing Sheets

U.S. PATENT DOCUMENTS

| | | | |
|---|---|---|---|
| 6,657,964 B1 * | 12/2003 | Kohzuki et al. | 370/236.1 |
| 6,693,913 B1 * | 2/2004 | Chiussi et al. | 370/412 |
| 6,826,620 B1 * | 11/2004 | Mawhinney et al. | 709/235 |
| 6,904,045 B1 * | 6/2005 | Chiussi et al. | 370/412 |
| 6,950,396 B1 * | 9/2005 | Assa et al. | 370/230.1 |
| 7,020,083 B1 * | 3/2006 | Garcia-Luna-Aceves et al. | 370/230 |
| 2002/0150048 A1 * | 10/2002 | Ha et al. | 370/231 |

FOREIGN PATENT DOCUMENTS

| | | |
|---|---|---|
| WO | WO 97/35410 | 9/1997 |
| WO | WO 00/04665 | 1/2000 |
| WO | WO 00/51296 | 8/2000 |

OTHER PUBLICATIONS

Andras Veres, "The Chaotic Nature of TCP Congestion Control", Proceedings IEEE Infocom 2000, vol. 3 of 3, conf. 19, XP-001044268, pp. 1715-1723.

W. Richard Stevens, "TCP Time Out and Retransmission, TCP/IP Illustrated, vol. 1, The Protocols," 2000, Computing Series XP002223116, pp. 297-337.

Upkar Varshney, "Selective Slow Start: A Simple Algorithm For Improving TCP Performance in wireless ATM Environment," Nov. 1997, vol. 1, XP-000799722, pp. 465-469.

J. Touch, "TCP Control Block Interpendence," Apr. 1997, IETF XP-002223117, pp. 1-11.

Robert Morris, "TCP Behavior With Many Flows," IEEE Conference on Network Protocols, Oct. 1997, XP-002223115, pp. 205-211.

Hari Balakrishnan, "TCP Behavior of a Busy Internet Server: Analysis and Improvements," InFocom 1998, pp. 252-262.

Shih-Chiang Tsao, "Pre-Order Deficit Round Robin: a new scheduling algorithm for packet-switched networks," Computer Networks, vol. 35, No. 2-3, Feb. 2001, pp. 287-305.

Prashant Pradhan, "Aggregate TCP Congestion Control Using Multiple Network Probing," IEEE, 2000, pp. 30-37.

* cited by examiner

QUALITY OF SERVICE MANAGEMENT FOR MULTIPLE CONNECTIONS WITHIN A NETWORK COMMUNICATION SYSTEM

REFERENCE TO RELATED APPLICATIONS

The present application claims priority from U.S. provisional application Nos. 60/291,825 filed May 18, 2001 and 60/309,212 filed Jul. 31, 2001. U.S. provisional application Nos. 60/291,825 and 60/309,212 are hereby incorporated herein by reference in their entirety.

BACKGROUND

1. Field of Invention

The present invention generally relates to data communication protocols, and more particularly, to systems and methods for quality of service management for multiple connections within a network communication system.

2. Description of Related Art

Transport Control Protocol (TCP) has become a common end-to-end data transport protocol used in modern data communication networks. Communication networks employing a TCP architecture offer significant advantages in terms of connectivity by enabling applications and users deployed on different physical networks to communicate with one another using a common communications protocol. The recent increase in the number and diversity of applications, users and networking environments utilizing TCP architectures, however, has exposed many of the limitations associated with a single, ubiquitous design. Because these architectures were primarily intended to provide reliable, sequenced transmission of non-real-time data streams over relatively high bandwidth wireline channels, these TCP architectures tend to exhibit sub-optimal performance when employed in applications or networking environments having different or incompatible characteristics.

Many of the problems associated with conventional TCP architectures stem from the flow control, congestion control and error recovery mechanisms used to control transmission of data over a communication network. Typical TCP flow control mechanisms, for example, utilize an acknowledgement-based approach to control the number and timing of new packets transmitted over the communication network. In these implementations, a sender maintains a congestion window parameter that specifies the maximum number of unacknowledged packets that may be transmitted to the receiver. As the sender receives acknowledgement signals from the receiver, the congestion control mechanism increases the size of the congestion window (and decreases the number of unacknowledged packets), thereby enabling the flow control mechanism to immediately transmit additional packets to the receiver. A problem with this approach is that it assumes that the network employs symmetric communication channels that enable data packets and acknowledgements to be equally spaced in time. In communication networks, such as wireless communication networks, that employ asymmetric uplink and downlink channels, where the available bandwidth towards the receiver is significantly higher than the available bandwidth towards the sender, the receiver may be unable to access the uplink channel in order to transmit acknowledgement signals to the sender in a timely manner. This initial delay in the transmission of acknowledgement signals may cause the sender to suspend transmission of additional data packets until additional acknowledgement signals are received, and then transmit a large burst of packets in response to the sender receiving a large group of acknowledgement signals. This bursty nature of data transmission may under-utilize the available bandwidth on the downlink channel, and may cause some applications requiring a steady flow of data, such as audio or video, to experience unusually poor performance.

The congestion control and error recovery mechanisms typically employed in TCP architectures may also cause the communication network to exhibit sub-optimal performance. In conventional TCP implementations, the congestion control and error recovery mechanisms are used to adjust the size of the congestion window (and therefore the number of new packets that may be transmitted to the receiver) based on the current state of the congestion control and error recovery algorithm. In the initial "slow start" state, for example, the sender rapidly probes for bandwidth by increasing the size of the congestion window by one for each new acknowledgement received from the receiver until the congestion window exceeds a certain congestion window threshold. Once the congestion window exceeds the congestion window threshold, the algorithm enters a "congestion avoidance" state, where the congestion window is increased by one whenever a number of acknowledgment signals equal to the size of the current congestion window is received. If the sender receives a predetermined number of duplicate acknowledgements or a selective acknowledgment ("SACK") that indicate that a packet in the sequence has not been received, the algorithm enters a "fast retransmit" state in which the sender decreases the congestion window to a size equal to one half of the current congestion window plus three, and retransmits the lost packet. After the "fast retransmit" state, the algorithm enters a temporary "fast recovery" state that increments the congestion window by one for each duplicate acknowledgement received from the receiver. If an acknowledgement for the lost packet is received before a retransmit timeout occurs (which is typically based on the average and mean deviation of round-trip time samples), the algorithm transitions to the "congestion avoidance" state. On the other hand, if an acknowledgement for the lost packet is not received before a retransmit timeout occurs, the sender resets the congestion window to one, retransmits the lost packet and transitions to the "slow start" state.

The problem with the foregoing approach is that the congestion avoidance and error recovery mechanisms assume that packet loss within the communication network was caused by congestion, rather than a temporary degradation in the signal quality of the communication channel. Although this assumption may work adequately for many wireline communication networks that have a relatively low occurrence of random packet loss, random packet loss due to fading, temporary degradation in signal quality, signal handoffs or large propagation delays occur with relatively high frequency in most wireless and other bandwidth constrained networks. Because conventional TCP architectures react to both random loss and network congestion by significantly and repeatedly reducing the congestion window, high levels of random packet loss may lead to significant and potentially unjustified deterioration in data throughput. TCP performance, particularly in the fast recovery state, may also be adversely impacted by signal handoffs and fades that typically occur in wireless networks. Handoffs and fades can cause multiple data packet losses, which can lead to failure of TCP's fast recovery mechanism and result in prolonged timeouts. If the handoff or fade lasts for several round trip times, failure of multiple retransmission attempts may cause exponential backoff of data throughput. This may result in long recovery times that last significantly longer than the originating fades or handoffs, and may cause TCP connections to stall for extended periods of time.

The problems associated with conventional TCP architectures become especially apparent in situations involving multiple connections between a given sender and a given receiver. Many applications, such as web browsers, often open multiple TCP connections between a sender and a receiver so that data may be communicated in parallel. Under conventional TCP architectures, these connections operate independently and may compete with one another for the same bandwidth, even though these connections serve the same host or the same application. This may lead to inefficient use of resources with decreased overall throughput as each connection attempts to maximize its bandwidth without regard to other connections. For example, when a new connection is initiated between a sender and receiver, the TCP congestion control mechanism aggressively increases the size of the congestion window until it senses a data packet loss. This process may adversely impact other connections that share the same reduced-bandwidth channel as the connection being initialized attempts to maximize its data throughput without regard of the other pre-existing connections. Furthermore, because conventional TCP architectures do not distinguish between data packets communicated over each connection, the competition among connections may cause lower priority data, such as email data, to obtain a greater portion of the available bandwidth than higher priority data, such as real-time voice or video. This lack of coordination between multiple connections to the same host may produce a sub-optimal allocation of the available bandwidth as connections carrying low priority data consume the available bandwidth at the expense of connections carrying higher priority data.

Therefore, in light of the deficiencies of existing approaches, there is a need for improved systems and methods for quality of service management for multiple connections within a network communication system, particularly network communication systems having wireless and other bandwidth constrained channels.

SUMMARY OF THE INVENTION

Embodiments of the present invention alleviate many of the foregoing problems by providing systems and methods for quality of service management for multiple connections within a network communication system. In one embodiment, a plurality of connections between a sender and a receiver are managed by determining a current transmission rate for each of the plurality of connections. This process may involve taking a ratio of the smoothed round trip time and smoothed congestion window associated with each connection. Once the current transmission rates have been determined, a host-level transmission rate between the sender and receiver may be then be calculated by summing the current transmission rates associated with the plurality of connections. The host-level transmission rate is then allocated among the plurality of connections based on a ratio of a weight associated with each connection and a sum of the weights for the plurality of connections in order to provide a more relevant allocation of the available transmission rate and reduce or avoid potentially destructive competition. A scheduler may then select data packets for transmission such that each selected data packet is associated with the connection having a highest difference between the allocated transmission rate and an actual transmission rate for the connection, where the actual transmission rate is determined from the number of selected data packets transmitted over the connection over a predetermined time period. The selected data packets are then transmitted to the receiver over their associated connections using a transmission timer having a period corresponding to the host-level transmission rate.

By allocating the host-level transmission rate among the plurality of connection based on the weight associated with each channel and selecting data packets for transmission based on the difference between the allocated transmission rate and the actual transmission rate, these aspects of the present invention ensure that higher priority connections are allocated a greater portion of the available transmission rate than lower priority connections. Furthermore, because data packets transmitted over the plurality of connections may be clocked at the host-level transmission rate, these aspect of the present invention may reduce or eliminate bursty data transmissions commonly associated with conventional TCP architectures. The transmission timer, together with the smoothing that may be used to determine the period of the transmission timer, may also provide a more accurate or relevant estimate of the available bandwidth toward the receiver and ensure that data is transmitted to the receiver at a rate that the communication channel can support. As a result, these aspects of the present invention offer significant advantages over conventional approaches by incorporating mechanisms for coordinating multiple connections between a given sender and a given receiver.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION

Aspects of the present invention provide systems and methods for quality of service management for multiple connections within a communications network. These aspects of the present invention provide improved coordination between multiple connections to a given host that share a common communication channel and provide improved efficiency of data transfer between devices connected via a communication network, such as a wireless and wireline network. The following description is presented to enable a person skilled in the art to make and use the invention. Descriptions of specific embodiments or applications are provided only as examples. Various modifications, substitutions and variations of embodiments will be apparent to those skilled in the art, and the generic principles defined herein may be applied to other embodiments and applications without departing from the spirit and scope of the invention. The present invention should therefore not be limited to the described or illustrated embodiments, and should be accorded the widest scope consistent with the principles and features disclosed herein.

Figure 1:
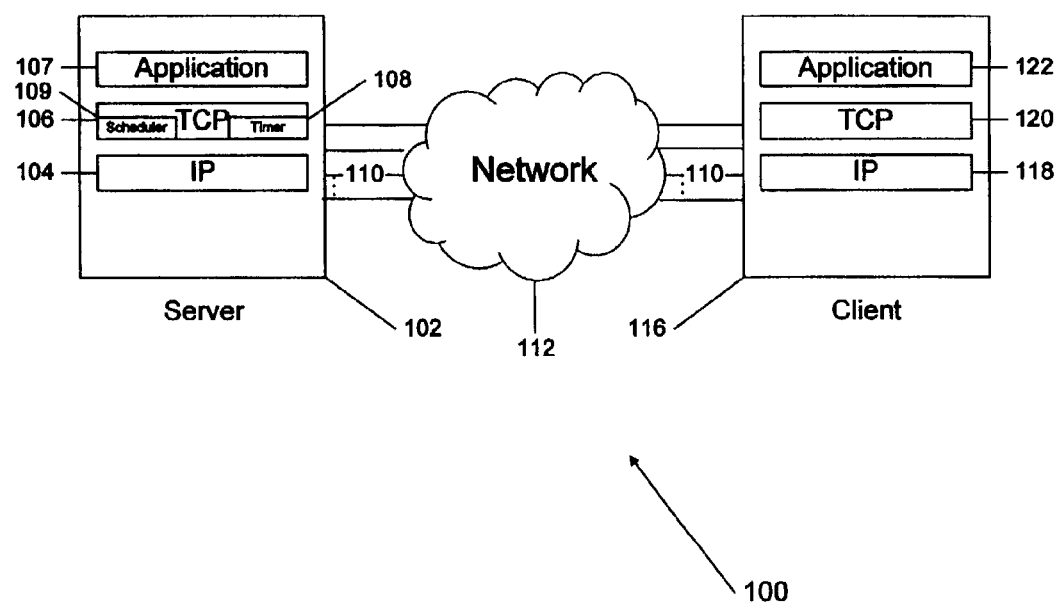
FIG. 1 illustrates an exemplary network communication system in which the principles of the present invention may be advantageously practiced.

Referring to FIG. 1, an exemplary network communication system in which the principles of the present invention may be advantageously practiced is illustrated generally at 100. As illustrated, the exemplary system includes a server 102 that communicates with a client 116 via a network 112, such as the Internet, General Packet Radio Service (GPRS) or other wireline or wireless network. The server 102 and client 116 may each comprise a computing device, such as a computer, mobile computer, laptop computer, wireless device, personal digital assistant, or cellular telephone, that is configured to transmit and receive data in accordance with a data communication protocol. As such, the terms "server" and "sender" generally represent a computing device that transmits data, and the terms "client" and "receiver" generally denote a computing device that receives data. Of course, the functions of the server 102 and the client 116 may be interchangeable depending on the direction of the data stream. For example, the server 102 could function as a client and the client 116 could function as a server in the event the server 102 receives a data stream from the client 116. Similarly, the server 102 and the client 116 may both act as a server and a client with respect to each other during the same communication session in the event the server 102 and the client 116 are performing duplex independent transmissions.

As further illustrated in FIG. 1, the server 102 includes an IP layer 104, a TCP layer 106 and a server application 107. The IP layer 104 provides data-level support for communications between the server 102 and the client 116, including managing the format of the data packets and the addressing scheme. The TCP layer 106 provides connection-level support for communications between the server 102 and the client 116, including managing the establishment of connections and delivery of data from and to the server application 107. In a similar manner, the client 116 also includes a client IP layer 118, a client TCP layer 120 and a client application 122 that perform functions similar to those described above with respect to the server 102. Notably, because the client application 122 may comprise multiple applications, such as video conferencing applications or email applications, or individual applications that support multiple independent connections, such as web browsers, the client 116 and the server 102 may communicate with one another via multiple, substantially-simultaneous connections 110 for which the TCP layers 108, 120 and IP layers 104, 118 of the client 116 and server 102 are responsible for managing.

In operation, the server 102 and the client 116 communicate with one another over the network 112 using data transmissions configured in accordance with the TCP protocol. In this context, the IP layer 104 and the TCP layer 106 of the server 102 communicate with the IP layer 118 and the TCP layer 120 of the client 116 to establish one or more virtual connections 110 between the server 102 and the client 116. For example, if the client 116 is running a web browser application, the web browser application may open a plurality of connections 110 between the client 116 and the server 102 such that each connection 110 corresponds to an element of the web page that the web browser application has requested. For each individual connection 110, data transmitted by the server 102 to the client 116 is formatted into data packets by the IP layer 104 and the TCP layer 106 and addressed to the client 116 according to the Internet Protocol ("IP") scheme. The formatted data packets are then transmitted to the client 116 over the associated connection 110. Once the client 116 receives data packets from the associated connection 110, the client IP layer 118 and the client TCP layer 120 disassemble the incoming data packets, extract the appropriate information and transmit appropriate acknowledgement signals back to the server 102. Additional data packets and associated acknowledgement signals may be similarly transmitted between the client 116 and the server 102 over the associated virtual connections 110 until all the elements associated with the web page have been received.

When conventional TCP architectures are deployed within a network communication system, such as the exemplary network communication system of FIG. 1, these architectures may cause the network to experience suboptimal performance due to the problems associated with managing multiple simultaneous connections between a given client and a given server. The flow control and congestion control mechanisms incorporated in many TCP implementations, for example, may cause some connections sharing the same bandwidth-limited communication channel to monopolize the available bandwidth at the expense of other connections, thereby resulting in inefficient or undesirable host-level utilization of limited bandwidth resources. These problems stem from the close interaction between the congestion control and flow control mechanisms implemented in these conventional TCP architectures. More particularly, conventional TCP architectures configure the flow control and congestion control mechanisms such that if the congestion control mechanism increases the size of the congestion window for a particular connection, this increase causes the flow control mechanism to immediately transmit additional data packets over that connection. Moreover, the transmission of additional data packets over a particular connection causes the congestion control mechanism to update the congestion window associated with that connection more frequently, which in turn may cause the flow control mechanism to transmit additional packets.

Although the foregoing processes may work well for single connections between a sender and a receiver that are deployed in a network communication system having symmetric uplink and downlink channels, these processes may experience sub-optimal performance when used for multiple connections to the same host or on different networking environments having incompatible characteristics. For example, if the foregoing processes are deployed in a network having asymmetric uplink and downlink channels, acknowledgement signals associated with one of a plurality of connections may be transmitted to the sender in a large group due to difficulty in accessing the shared uplink channel. The receipt of a large group of acknowledgement signals may cause the congestion control mechanism to significantly increase the size of the congestion window associated with that connection based on the erroneous assumption that the downlink channel has additional available bandwidth. As a result of this increase, the flow control mechanism will transmit a large burst of data packets over that particular connection, which may congest the entire downlink channel and interfere with the other connections to the same host. The aggressive increase in the size of the congestion window typically performed by conventional congestion control mechanisms during slow start may further degrade performance by causing new connections being established over the downlink channel to attempt to maximize its bandwidth at the expense of existing connections already in progress. Moreover, because conventional TCP flow control and congestion control mechanisms do not coordinate connections at the host-level, the independent regulation of the connections 110 may inadvertently bias data transmissions toward lower priority connections at the expense of higher priority connections, thereby producing an undesirable allocation of the limited bandwidth resources of the downlink channel.

Embodiments of the present invention alleviate many of the foregoing problems by separating the flow control and congestion control mechanisms and by utilizing host-level statistics to more effectively manage and prioritize multiple connections to a given host. In one embodiment of the present, a transmit timer 108 and a scheduler 109 are utilized to coordinate data transmissions by each individual connection 110 and to provide host-level data flow control. For example, instead of permitting each individual TCP connection 110 to self-regulate data transmission based on the receipt of acknowledgement signals, the transmit timer 108 coordinates transmissions over all connections 110 to the receiver such that data packets are transmitted to the receiver at a host-level transmission rate (which may be based on the sum of the current transmission rates of the plurality of the connections). The scheduler 109 allocates the host-level transmission rate among the connections 110 based on priority levels assigned to each connection 110 such that higher priority connections receive a greater allocation of the host-level transmission rate than lower priority connections. The scheduler 109 also cooperates with the transmit timer 108 by determining which of the plurality of connections 110 is permitted to transmit a data packet in response to each expiration of the transmit timer 108 based, for example, on the then-current differences between the allocated transmission rate and the actual transmission rate for each connection. With regard to congestion control, embodiments of the present invention adjust the congestion window for each connection based on the sum of the changes in the congestion window for all connections to the same host. By using host-level variables to adjust the congestion window, this aspect of the present invention may provide a better estimate of congestion within the network and reduce or avoid substantial and repeated reductions in the congestion window due to random packet loss. As will be described in greater detail below, other embodiments of the present invention provide additional mechanisms for determining the period of the transmit timer 108, adjusting the size of the congestion window, scheduling data packets for transmission based on the priority of the associated connection, and responding to an existing connection transitioning from an active state to an inactive state, or vice versa.

Figure 2:
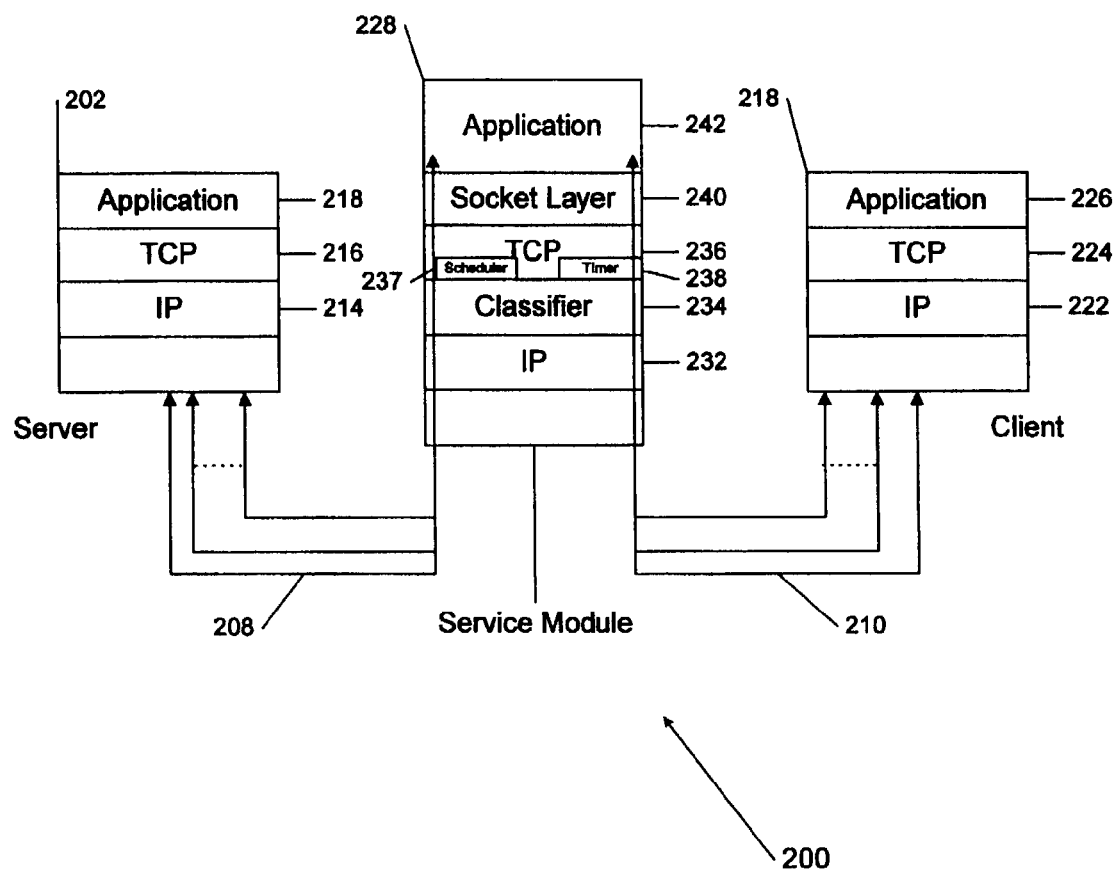
FIG. 2 illustrates another exemplary communication system in which the principles of the present invention may be advantageously practiced.

Referring to FIG. 2, another exemplary communication system in which the principles of the present invention may be advantageously practiced is illustrated generally at 200. In this exemplary system, a service module 228 is deployed between a server 202 and client 218 to act as an intermediary and to manage associated data transmissions between the server 202 and client 218. Unlike in the embodiment of FIG. 1, where TCP data transmissions are managed by the server, the embodiment of FIG. 2 utilizes the service module 228 to intercept and regulate data packets communicated between the server 208 and client 218. For example, the service module 228 may include a classifier 234 that classifies packets transmitted via a particular connection to determine whether the connection corresponds to a service application 242 supported by the service module 228. If so, the service module 228 breaks the connection between the server 202 and the client 218 to form a server side connection 208 between the service application 242 and the sever 202 and a client side connection 210 between the service application 242 and the client 218. Because the client 218 may initiate multiple connections with the server 202, the service module 228 may manage multiple server side connections 208 and client side connections 210. This process forms multiple separate connections that pass through the TCP layer 236 and the IP layer 232 of the service module 228. Accordingly, embodiments of the present invention may utilize a scheduler 237 and transmit timer 238 within the service module 228 to provide quality of service management of both the server side connections 208 and the client side connections 210, thereby enhancing end-to-end performance.

The foregoing description of the embodiment of FIG. 2 is provided to enable a person of ordinary skill in the art to make and use this aspect of the present invention. Additional information regarding the structure, features and functionality of an exemplary service module deployed between a server and a client is described in U.S. patent application Ser. No. 10/095,551, filed Mar. 11, 2002, entitled "Service-Based Compression of Content Within A Network Communication System" and in U.S. patent application Ser. No. 10/126,131, filed Apr. 19, 2002, entitled "Systems and Methods for Providing Differentiated Services within a Network Communication System," which have been assigned of record to the assignee of the present application and are incorporated herein by reference.

Figure 3:
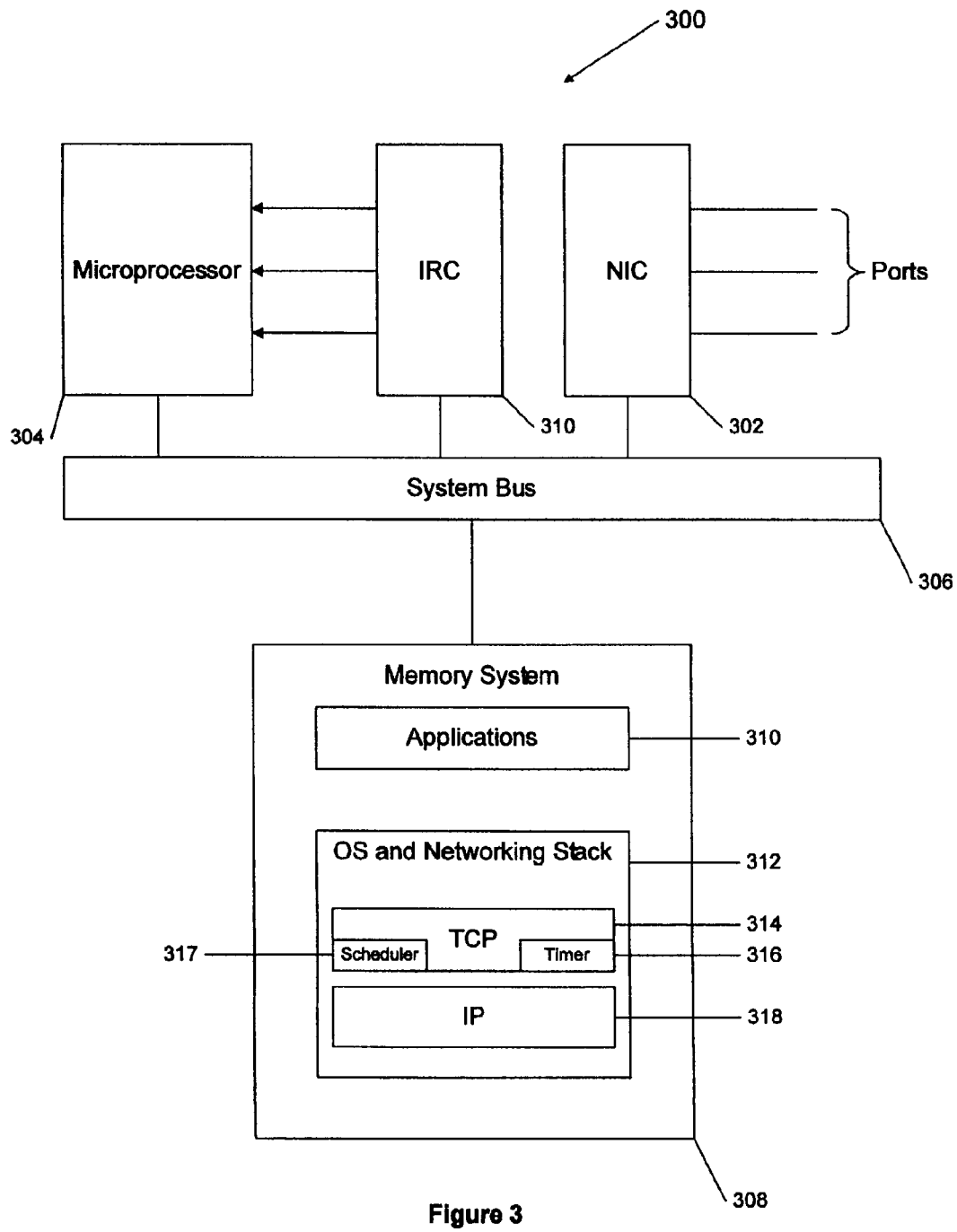
FIG. 3 illustrates an exemplary platform that may be used in accordance with the present invention.

Referring to FIG. 3, an exemplary platform that may be used in accordance with the present invention is illustrates generally at 300. As illustrated, the exemplary platform includes a network interface card 302, a microprocessor 304, a memory system 308 and an interrupt controller 310, which are all operably coupled to a system bus 306. The network interface card 302 interfaces with other systems or nodes within the communication network, such as a network router, gateway, base transceiver station or the like, via one or more data ports. The memory system 308 may comprise a random access memory, hard drive, floppy disk, compact disk, or another type of computer readable medium that stores various modules for controlling the functionality of the exemplary platform. In particular, the memory system 308 may be configured to store applications 310 and an operating system and networking stack 312, which may include a TCP layer 314 and an IP layer 318. The TCP layer 314 may further include a number of features that enhance TCP performance according to various aspects of the present invention, such as a scheduler 317 (for scheduling data packets for transmission over multiple connections to the receiver) and a host-level transmit timer 316 (for controlling the rate at which data packets are transmitted to the receiver).

Figure 4:
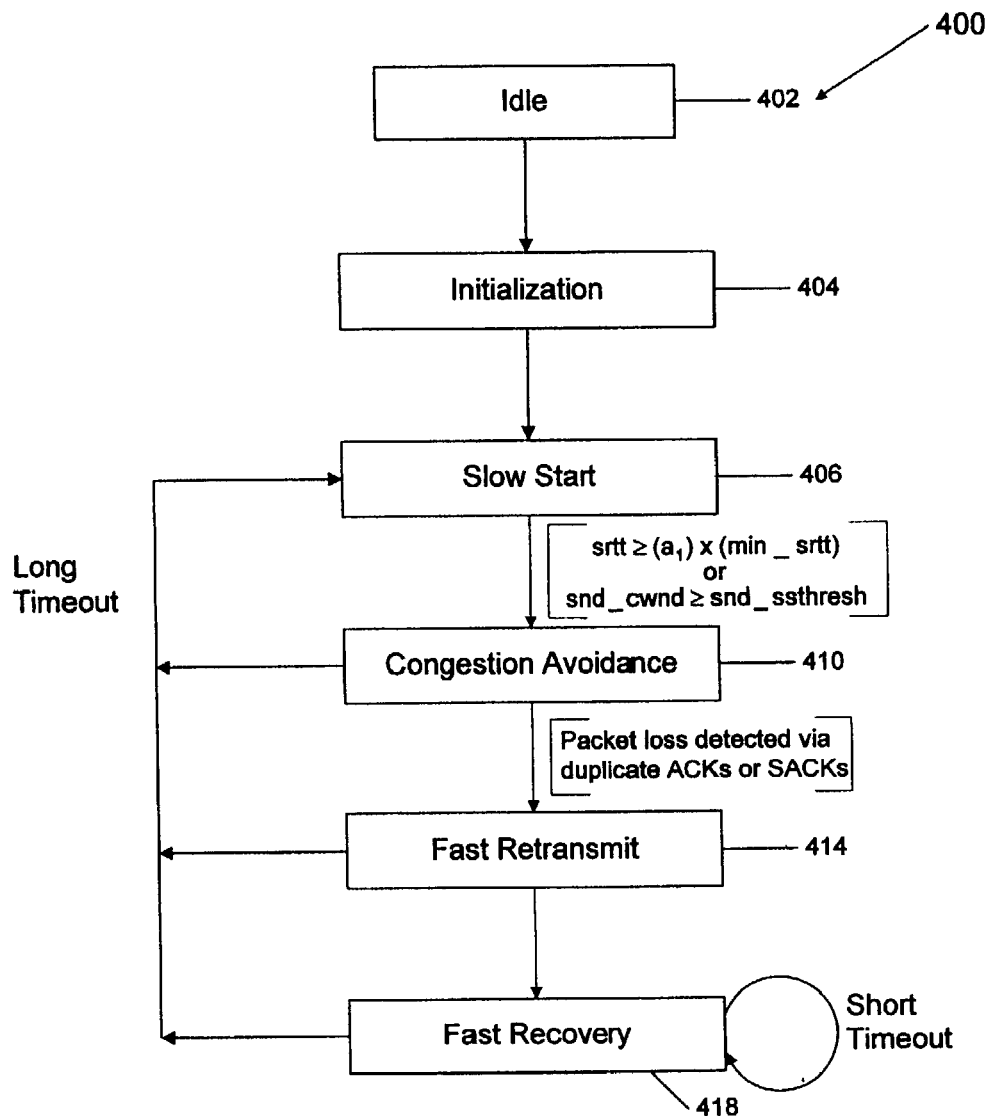
FIG. 4 illustrates an exemplary method in flowchart form for providing congestion control in accordance with an embodiment of the present invention.

Referring to FIG. 4, an exemplary method in flowchart form for providing congestion control in accordance with an embodiment of the present invention is illustrated generally at 400. The congestion control process of FIG. 4 initializes and maintains the state and relevant variables for each connection in order to control congestion at the connection-level. More particularly, the congestion control process is responsible for adjusting the size of the congestion window (and therefore the number of new packets that may be sent to the receiver) and determining whether to re-transmit a lost data packet. As illustrated in FIG. 4, congestion control is performed through a series of states that are initiated in response to various trigger events, such as arrival of acknowledgement (ACK) or selective acknowledgement (SACK) signals, or the expiration of a transmit timer, short timer or long timer. Each state is responsible for performing specific actions with additional actions being taken response to transitions between the states or in response to associated trigger events.

In operation, when a new connection with a given host is initiated, the congestion control process leaves the idle state 402 and enters the initialization state 404. In the initialization state 404, a number of variables relevant to congestion control are initialized, including, for example, a congestion window (snd_cwnd) that determines the number of unacknowledged packets that may be sent to the receiver. Once initialization of relevant variables is completed, the congestion control process enters the slow start state 406. During the slow start state 406, the congestion window is increased by one for each acknowledgement signal received. In order to prevent the size of the congestion window increasing too rapidly so as to interfere with other connections, the size of the congestion window is compared with a congestion window threshold to determine when to transition to the congestion avoidance state 410. The transition from the slow start 406 to the congestion avoidance state 410 may also be determined by comparing a smoothed round trip time (srtt) associated with the connection with a smoothed round trip time threshold, which may provide a more relevant measure of potential congestion than a congestion window threshold. If one of the two thresholds is exceeded, the congestion control process transitions to the congestion avoidance state 410.

In the congestion avoidance state 410, the congestion window is adjusted more gradually based on a four-state model (illustrated in FIG. 5A) in an attempt to efficiently utilize the available bandwidth while minimizing or avoiding data packet losses. Unlike conventional TCP approaches that independently adjust the congestion window associated each connection, the congestion avoidance state 410 of the present invention utilizes information associated with all connections over the downlink channel and adjusts each connection window in a manner that attempts to reduce or avoid the substantial and repeated reductions in data throughput that can arise due to random packet losses. Because the congestion window not only regulates the number of packets that may be sent to the receiver, but also forms a basis for regulating the host-level transmission rate of the transmit timer, providing intelligent control of the congestion window can be an important factor for improving overall system performance. By managing the congestion window for each individual connection based on host-level data transmission statistics, the sender is able to optimize data transfers for all connections to the same host.

Figure 5A:
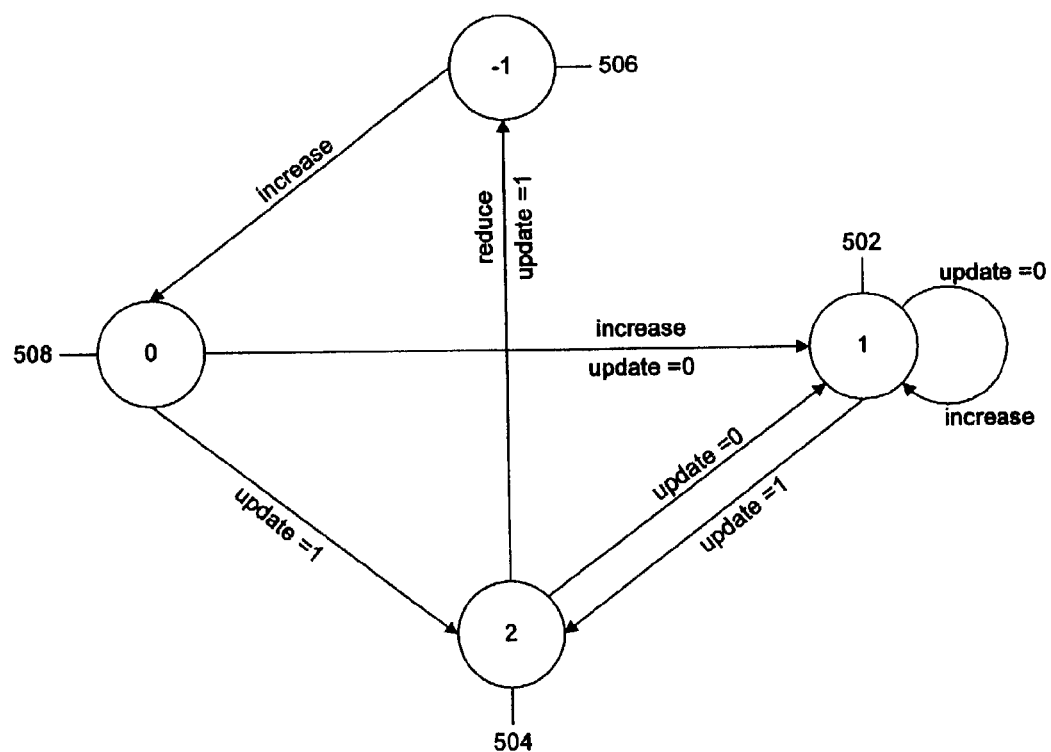
FIG. 5A illustrates an exemplary state model that may be used to adjust the congestion window in accordance with an embodiment of the present invention.

Referring to FIG. 5A, an exemplary state model that may be used to adjust the congestion window in accordance with an embodiment of the present invention is illustrated. The state model illustrated in FIG. 5A may be used by the congestion avoidance state 410 of FIG. 4 to update the congestion window. As illustrated in FIG. 5A, the state model transitions between four different states denoted as state 1 (502), state 2 (504), state-1 (506) and state 0 (508). The four state model begins at state 1 (501) and then transitions between the four states based on measurements of channel or network resource availability that are periodically performed by an "update" function (described in connection with FIG. 5C). If the update function returns a value of "0," this indicates that no traffic congestion has been detected. Conversely, if the update function returns a value of "1", then this indicates that traffic congestion has been detected. Transitions between the various states of FIG. 5A are accompanied by increases or decreases in the size of the congestion window, denoted generally as "increase" or "decrease." In practice, if the update function does not detect congestion, the process will iteratively enter state 1 (501), during which the congestion window for the connection is increased. If the update function detects congestion, the process transitions to state 2 (504). State 2 (504) is basically an intermediate state that allows the congestion avoidance process to settle and to determine whether the initial detection of congestion corresponds to actual network congestion, random packet loss or mere temporary decrease in the signal quality of the downlink channel. If the update function continues to detect congestion, the congestion window is reduced as the process transitions to state-1 (506), which is followed by a small increase in the congestion window as the process transitions to state 0 (508). The process of decreasing and then increasing the congestion window allows the congestion avoidance process to provide a more robust response to transient fluctuations within the network, without the substantial and repeated reductions in data throughput commonly associated with conventional TCP architectures.

Figure 5B:
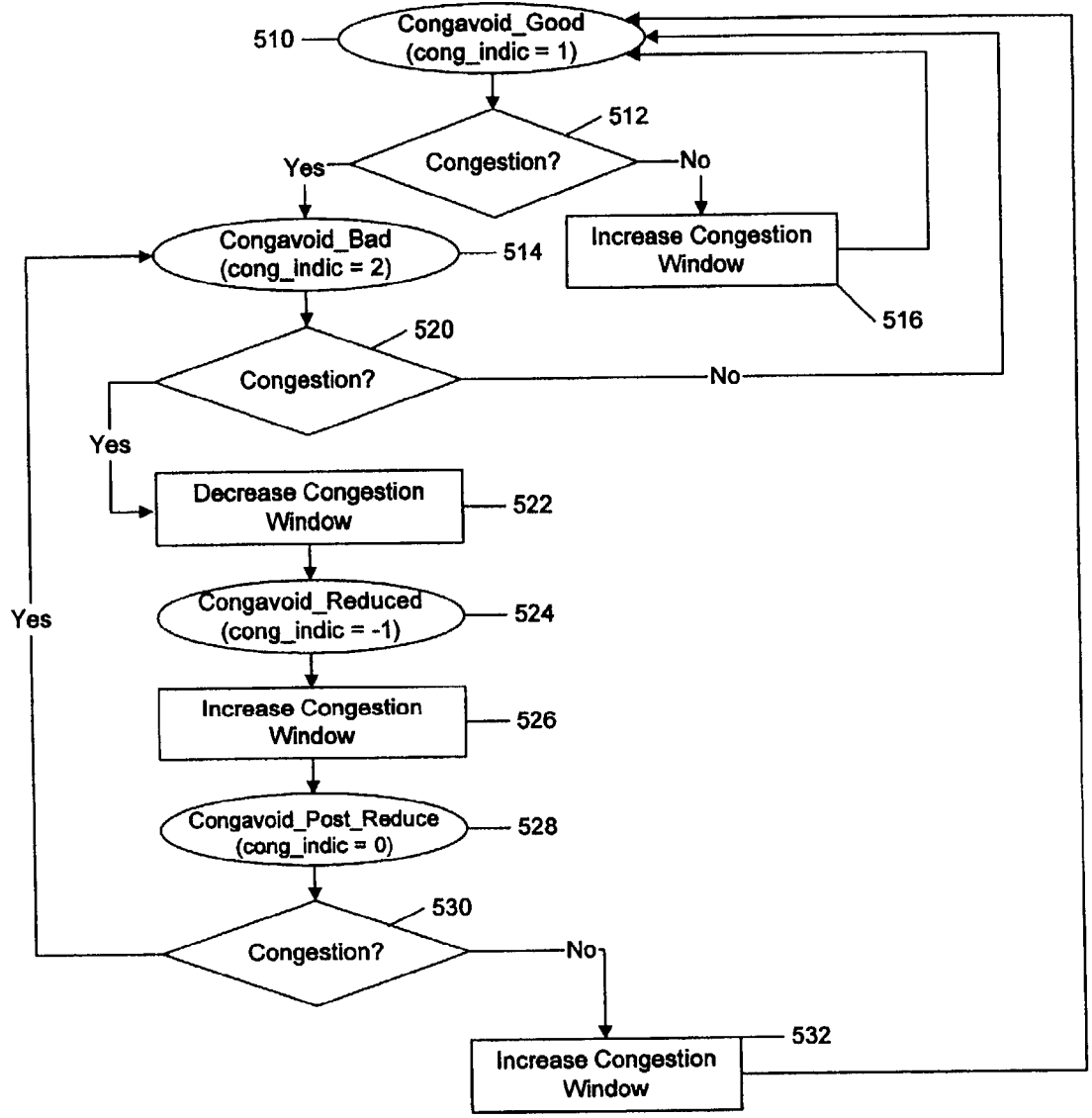
FIG. 5B illustrates a flow diagram showing exemplary state transitions corresponding to the exemplary state model of FIG. 5A.

FIG. 5B illustrates a flow diagram showing exemplary state transitions corresponding to the exemplary state model from FIG. 5A. For example, the four states illustrated in FIG. 5B essentially correspond to the four states from FIG. 5A as follows: state CONGAVOID_GOOD (510) in FIG. 5B corresponds to state 1 (502) in FIG. 5A; state CONGAVOID_BAD (514) in FIG. 5B corresponds to state 2 (504) in FIG. 5A; state CONGAVOID_REDUCED (524) in FIG. 5B corresponds to state-1 (506) in FIG. 5A; and state CONGAVOID_POST_REDUCE (528) in FIG. 5B corresponds to state 0 (508) in FIG. 5A. In the embodiment of FIG. 5B, the process for updating the congestion window may begin initially in state CONGAVOID_GOOD (510). The management process then progresses to step 512, where a determination is made whether the network is experiencing congestion. This determination is made by running an update function that employs a number of channel-level measurements to assess availability of transmission resources, which is further described below in connection with the embodiment of FIG. 5C.

If the update function does not detect congestion at step 512, the process increases the congestion window at step 516 and returns to state CONGAVOID_GOOD (510). In the embodiment of FIG. 5B, the congestion window is increased or decreased by one data packet at a time. In another embodiment, the congestion window may be increased or decreased by more than one packet. If congestion is detected at step 512, the traffic management process enters state CONGAVOID_BAD (514). The traffic management process then proceeds to state 520 where another decision regarding the existence of congestion in the network is made using the update function. If no congestion is detected at step 520, then the process returns to state CONGAVOID_GOOD (510). Otherwise, if congestion is detected at step 520, the process decreases the congestion window at step 522 and enters state CONGAVOID_REDUCED (524). State CONGAVOID_REDUCED (524) is a transient state that immediately follows a reduction in the size of the congestion window. Once in this state, the traffic management process attempts to increase the congestion window at step 526 in order to maximize throughput. From step 526, the process enters state CONGAVOID_POST_REDUCE (528), which is an intermediate state followed by another call to the update function at step 530. If congestion is identified at step 530, the process returns to state CONGAVOID_BAD (514) in anticipation of a possible need to decrease the congestion window. If no congestion is detected at step 530, the process assumes that additional network transmission capacity exists, and increases the congestion window at step 532 to take advantage of this additional capacity. The traffic management process then returns to state CONGAVOID_GOOD (510).

Figure 5C:
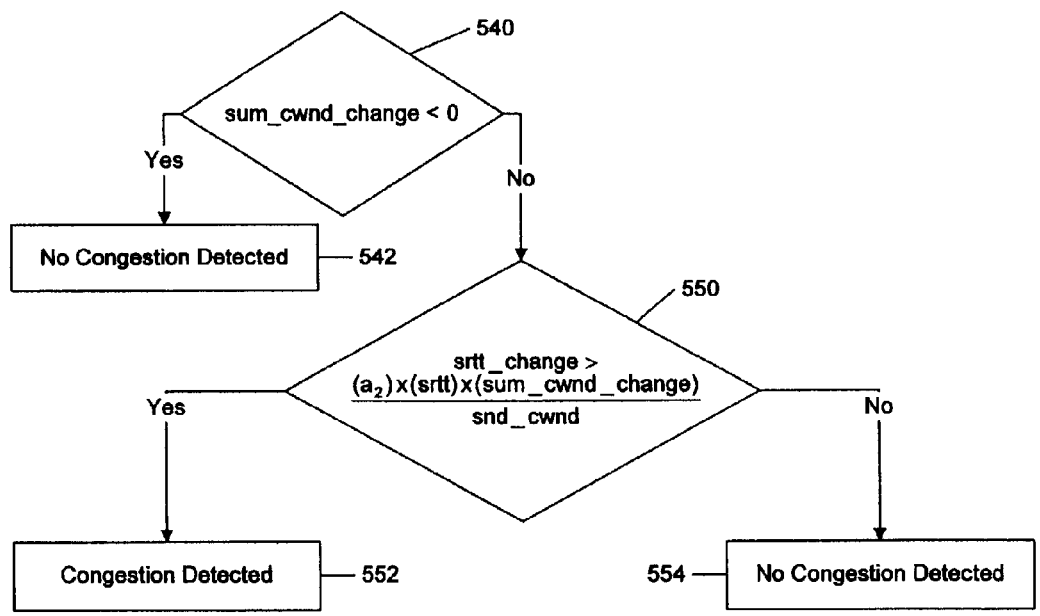
FIG. 5C illustrates an exemplary process that may be employed to detect network congestion in accordance with an embodiment of the present invention.

Referring to FIG. 5C, an exemplary process for detecting network congestion in accordance with an embodiment of the present invention is illustrated. The exemplary process of FIG. 5C represents the process performed by the update function in steps 512, 520 or 530 of the embodiment of FIG. 5B to determine network congestion. As illustrated in FIG. 5C, the determination of network congestion is made using host-level statistics that take into account parameters associated with all active connections to the same host. For example, the determination of network traffic congestion may be made based on the round trip time of data packets for individual connections (which provides a measure of the propagation delay within the network) and the congestion windows associated with all active connections. This determination of network congestion is made in two stages. In a first stage, a decision whether variable sum_cwnd_change is less than zero is made at step 540. The variable sum_cwnd_change represents the change in the sum of the congestion windows for all active connections and provides a measure of the total amount of data sent by all connections. If the condition at step 540 is true (indicating that the sum of the change in all congestion windows has not increased), a determination is made at step 542 that no congestion has been detected. One reason for declaring that no congestion exists in this situation is that a decrease in the change in congestion windows suggests that additional traffic capacity has become available in the network, and therefore performing additional tests for network congestion may not be necessary.

If the condition at step 540 is false, however, the traffic management process proceeds to a second decision stage at step 550, where another evaluation regarding the existence of congestion in the network is made based on the following equation:

$$srtt\_change > a_2 * srtt * sum\_cwnd\_change / snd\_cwnd \quad (1)$$

In equation (1), srtt represents the smoothed estimate of the round trip time for the connection under examination (which be may determined substantially as described below in connection with the embodiment of FIG. 6). The variable srtt_change represents the change in the smoothed estimate of the round trip time over a predetermined time period, such as the period of time since the last update. Scaling constant $a_2$ represents a constant used in congestion detection that may have a value between 0 and 1. In a particular embodiment, when the network exhibits a significant amount of traffic imbalance, variable $a_2$ is assigned a numerical value of 1. The variable snd_cwnd represents the congestion window for the particular connection under consideration. When the condition expressed in equation (1) is true, the congestion detection process advances to step 552 and declares that network congestion has been detected. Conversely, if the condition evaluates as false, the congestion detection process progresses to step 554 where it declares that no network congestion exists. The output of the process of FIG. 5C is then used in the four-state model described above in order to adjust the congestion window associated with the connection under examination.

Referring back to FIG. 4, the congestion control process may transition from the congestion avoidance state 410 in response to a number of trigger events. For example, if persisting traffic congestion prevent an acknowledgement signal from being received for an extended period of time, a long timeout trigger may lead the congestion control process to return to the slow start state 406, where the congestion window corresponding to that connection is reset to its initial value. If only limited packet loss is detected via a predetermined number of duplicate acknowledgement signals, selective acknowledgement signals or short timeouts, however, the congestion control process enters the fast retransmit state 414, where the lost data packet is retransmitted. Once the data packet is retransmitted, the congestion control process 400 enters the fast recovery state 418. In the fast recovery state 418, the congestion window for the connection may be reduced or the sender advertised window may be increased, while data packets are retransmitted. The congestion control process may remain in the fast recovery state 418 in response to each short timeout until a long timer expires or until additional acknowledgment signals are received. If the long timer expires first, the congestion control process returns into the slow start state 406. If acknowledgements for the packets are received before the long timer expires, the congestion control process returns into the congestion avoidance state 410.

Additional information regarding the functionality, features and operation of the congestion control process that may be utilized to provide data transport acceleration and management based on a timer-based flow control mechanism is described in U.S. patent application Ser. No. 10/061,574, filed Jan. 29, 2002, entitled "Data Transport Acceleration and Management Within A Network Communication System," which has been assigned of record to the assignee of the present application and is incorporated herein by reference.

Figure 6:
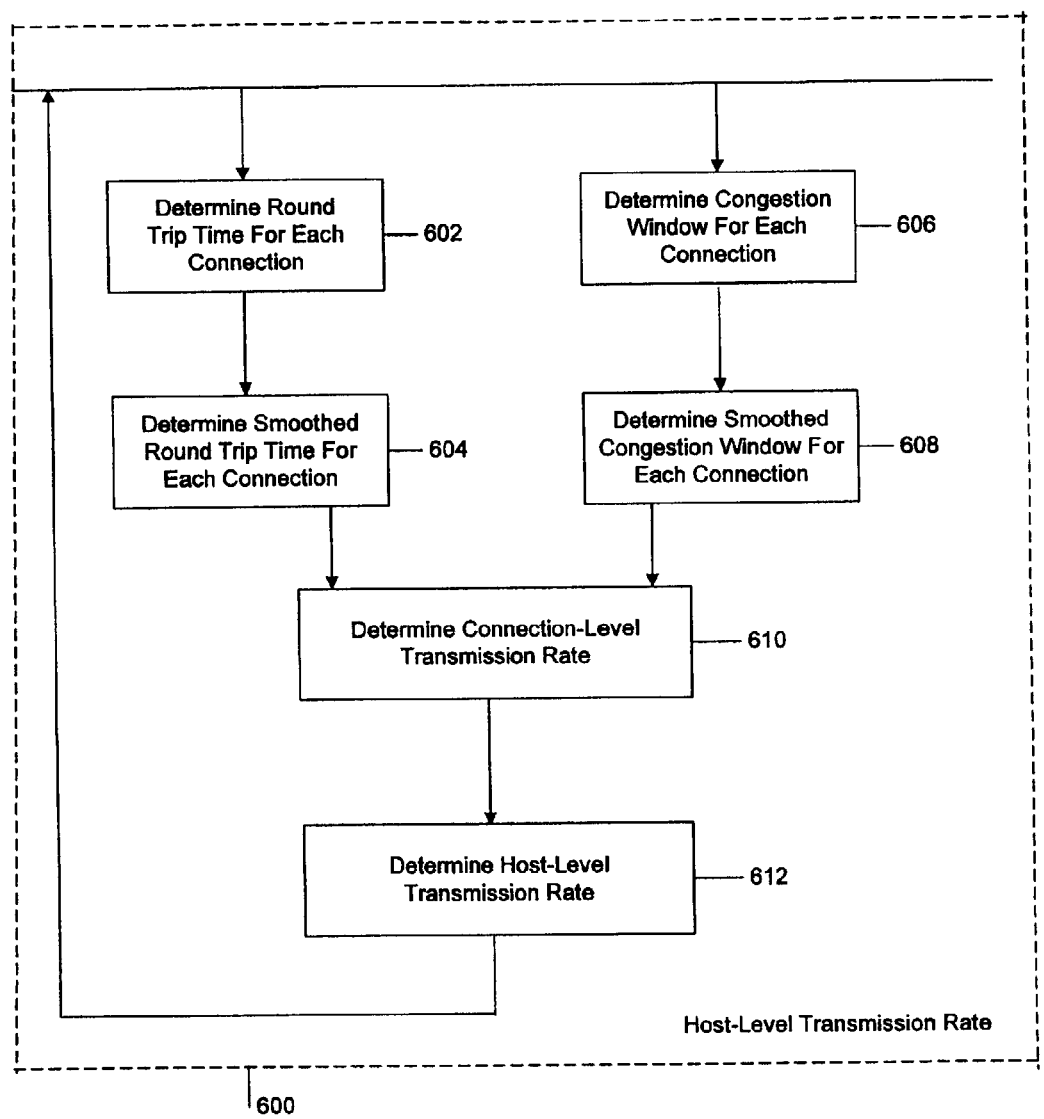
FIG. 6 illustrates an exemplary process for determining the host-level transmission rate between a sender and receiver in accordance with an embodiment of the present invention.

FIG. 6 illustrates an exemplary process for determining the current transmission rate for individual connections in accordance with an embodiment of the present invention. As mentioned above, the current transmission rate for each connection may be used by the transmit timer to regulate the timing of data packets transmitted to the receiver. For example, if there is only one active connection between the sender and receiver, the transmit timer associated with that connection is configured to have a period corresponding to the current transmission rate. This process enables the transmit timer to regulate the timing of data packets over that connection such that a data packet is transmitted to the receiver in response to each expiration of the transmit timer, thereby providing a steady flow of data packets to the receiver and avoiding bursty data transmissions that commonly occur in conventional TCP architectures. On the other hand, if there are a plurality of active connections between the sender and receiver (which may be determined by examining the source and destination addresses for each connection), the transmit timer associated with the plurality of connections is configured to have a period corresponding to the sum of the current transmission rates for the connections. As a result, this process enables the transmit timer to regulate the timing of data packets over all connections to the receiver such that a data packet is transmitted to the receiver over a selected one of the connections in response to each expiration of the transmit timer, thereby minimizing the destructive competition among the plurality of connections and ensuring that data is transmitted to the receiver at a rate the communication channel can support. The transmit timer may also cooperate with a scheduler that allocates the host-level transmission rate among the plurality of connections so as to bias data transmission toward higher priority connections. Because the foregoing flow control process may operate in parallel with the congestion control process of FIG. 4, the transmit timer (and scheduler) may be configured to regulate transmission or re-transmission of data packets during the slow start, congestion avoidance, fast retransmit or fast recovery states.

As illustrated in FIG. 6, the current transmission rate for each connection is determined by taking a ratio of the smoothed round trip time and smoothed congestion window associated with each connection to a given receiver. The current transmission rates for each connection are then summed to determine a host-level transmission rate. As such, the exemplary process may be initiated at step 602 by determining the current round trip time associated with each connection. These round trip time samples may be determined by measuring the time between transmission a data packet and receipt of an associated acknowledgement signal. The smoothed round-trip time for each connection at a particular time t may then be determined at step 604 in accordance with the following formula:

$$srtt[t]=K_1*srtt[t-1]+K_2*\text{measured\_rtt}, \quad (2)$$

where measured_rtt corresponds to the round trip time ("rtt") measured between the sender and the receiver, and $K_1$ and $K_2$ are configurable constants for adjusting the degree to which the smoothing process is biased toward earlier or later samples. In one embodiment, $K_1$ may be set to ⅞ and $K_2$ may be set to ⅛. As an alternative to equation (2), the smoothed round trip time (srtt) may be determined based on the average and mean deviation of previously measured round-trip time samples and may be periodically updated to include recent measurements. Furthermore, the smoothed round trip time may also be determined based on additional round-trip time samples (in addition to the two most recent samples set forth in equation (2)) with additional configurable constants for providing appropriate biasing.

At step 606, the exemplary process determines the current congestion window for each of the plurality of connections to the given receiver (which may be adjusted in accordance with the congestion control process described above with respect to FIGS. 4 and 5). Once the congestion window corresponding to the connections are determined, the smoothed congestion window for each connection is determined at step 608. The smoothed congestion window represents a weighted measure of the number of data packets that the respective connection is prepared to transmit to the client and is determined based on the then-current congestion window. According to one embodiment of the present invention, the smoothed congestion window for a particular connection is periodically updated using the following formula:

$$\text{smoothed\_cwnd}[t]=a_4*\text{smoothed\_cwnd}[t-1]+(1-a_4)*\text{snd\_cwnd}, \quad (3)$$

where smoothed_cwnd [t] represents the smoothed congestion window at a particular time t, snd_cwnd represents the then-current congestion window, and $a_4$ represents a configurable constant for adjusting the degree to which the smoothing process is biased toward earlier or later samples. Once the foregoing parameters are determined, the current transmission rate for each connection may be determined at step 610 based on the following equation:

$$T=srtt[t]/\text{smoothed\_cwnd}[t], \quad (4)$$

where srtt[t] represents the then-current value of a smoothed estimate of the round trip time determined in accordance with equation (2), and smoothed_cwnd [t] represents the smoothed congestion window determined in accordance with equation (3). In an alternative embodiment, the constant $a_4$ in equation (3) may be set to zero so that the smoothed congestion window will equal the then-current congestion window. This alternative embodiment offers certain advantages by making the calculation of the current transmission rate for each connection more responsive to fluctuations in network congestion.

Once the current transmission rates for each of the plurality of connections to the given receiver are determined, the host-level transmission rate may be determined by summing the current transmission rates (T) for each of the plurality of connections. This host-level transmission rate may then be used to set the period of the transmit timer and thereby regulate the timing of data packet transmissions over all connections to the given receiver such that a data packet is transmitted to the receiver in response to each expiration of the transmit timer.

Figure 7:
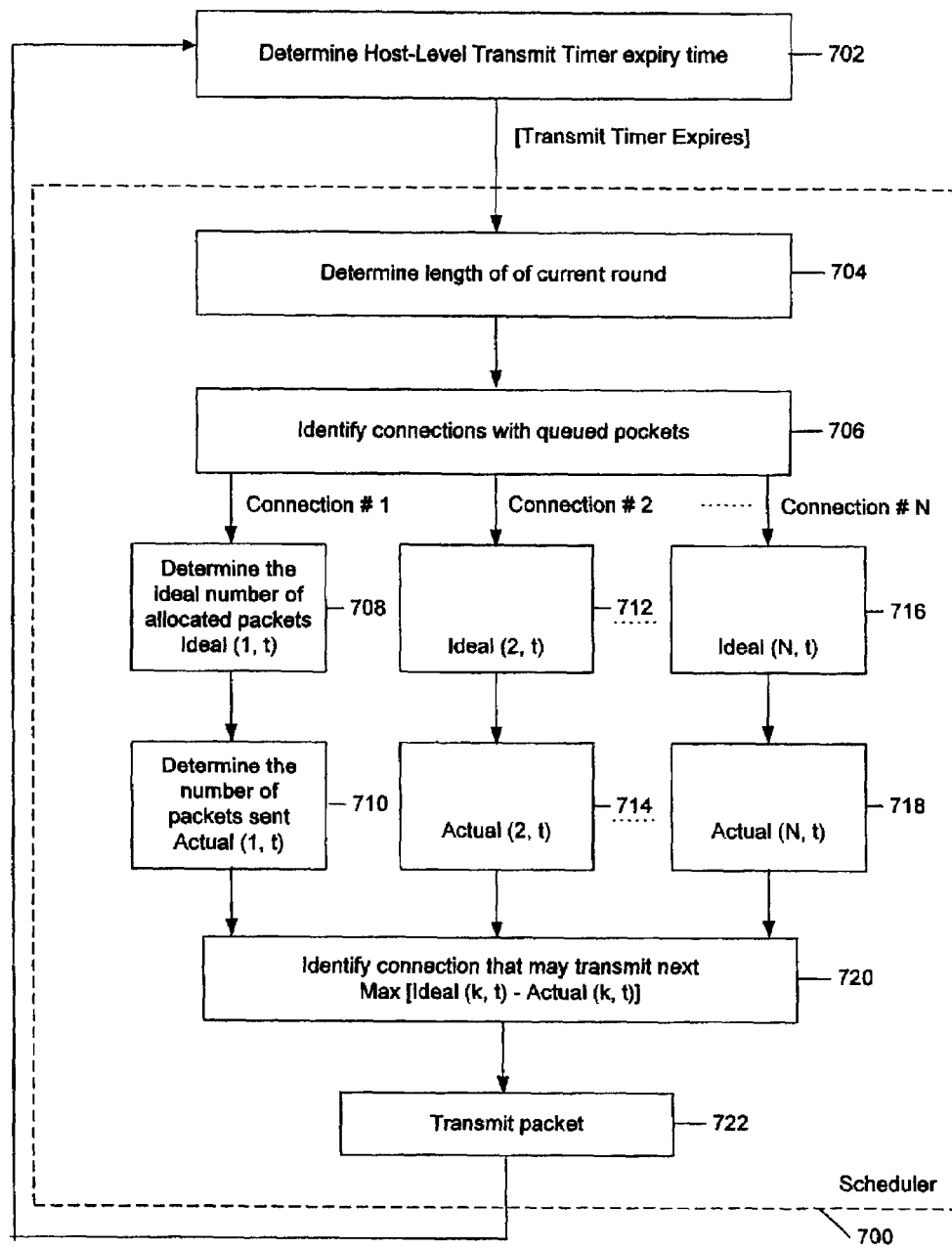
FIG. 7 illustrates an exemplary process for scheduling data packets associated with a plurality of connections and transmitting selected data packets to a receiver at a host-level transmission rate in accordance with an embodiment of the present invention.

Referring to FIG. 7, an exemplary process for scheduling data packets associated with a plurality of connections and transmitting selected data packets to a receiver at a host-level transmission rate in accordance with an embodiment of the present invention is illustrated. The exemplary process of FIG. 7 essentially allocates the host-level transmission rate among the plurality of connections to the host based on a weight assigned to each connection in order to allocate a greater portion of the available transmission rate to higher priority connections. The weights for each connection may be determined in a number of different ways. For example, packet header information associated with queued data packets may be examined to determine the type of data to be transmitted over each active connection. In particular, many applications are associated with so-called well-known ports that are incorporated into associated packet headers. Accordingly, the source and destination ports may be examined and assigned a weight based on the type of application associated with these well-know ports. For example, if a source or destination port corresponds to port "80" (which designates a web application), the corresponding connection may be assigned a higher weight than a connection that corresponds to port "143" (which designates an IMAP email protocol). If the port assignments associated with some of the connections are unknown, then these connections may be assigned a default weight so that these connections are provided a fair allocation of the host-level transmission rate. Other embodiments may assign weights based on the amount of queued data packets to be transmitted over each connection, the identity of the source or destination addresses, or other parameters.

Once weights have been assigned to each connection, the exemplary process of FIG. 7 waits for the next expiration of the transmit timer at step 702 (where the period of the transmit timer was previously set to the host-level transmission rate determined in accordance with the embodiment of FIG. 6). Upon each expiration of the transmit timer, the scheduler (generally denoted by reference numeral 700) is initiated to select a data packet from one of the connections for transmission. In order to select the appropriate data packet (and therefore allocate the host-level transmission rate among the connections based on the weight of each connection), the scheduler first determines the length of the current round at step 704. The length of each round equals the sum of the weights for all active connections and enables the scheduler to ensure that the proper number of data packets are transmitted over each connection during each round.

Once the length of the current round is determined, the process then proceeds to step 706 where the connections having queued packets for transmission are identified. For each identified connection (denoted in FIG. 7 as connections 1 to N), the ideal number of transmitted data packets and the actual number of data packets transmitted during the current round are determined at steps 708, 710, 712, 714, 716 and 718. In this context, the ideal number of data packets essentially corresponds to the allocated transmission rate and the actual number of data packets corresponds to the number of data packets transmitted during the current round. For example, if the current round started at time to and the current time is t, then the ideal number of data packets for each active connection may be determined by the following formula:

$$\text{Ideal}(j, t) = \text{scale\_factor} * \text{host\_rate} * (t-t_0) * \text{weight}(j) / \text{sum\_of\_weights}, \quad (5)$$

where the scale_factor is chosen large enough to minimize integer effects. The actual number of data packets transmitted over connection j by time t (multiplied by an appropriate scale factor) may be similarly denoted by Actual (j, t). Based on these parameters, the scheduler may then identify the connection that may transmit the next data packet at step 720 by selecting the connection having the maximum difference between Ideal (j, t) and Actual (j, t). The data packet in the queue associated with the identified connection may then be transmitted to the receiver at step 722, and the process transitions back to step 702 to wait for the next expiration of the transmit timer.

If a connection enters or leaves an active state within a round, the round may be scaled up or down in order to accommodate the new sum of weights parameter. Furthermore, the Ideal (j, t) and Actual (j, t) for each connection may also be scaled up or down by the same factor. For example, if a connection k enters an active state in the middle of a round at time t, then the foregoing parameters may be updated in accordance with the following algorithm:

new_round_start_time=old_round_start_time=$t_0$ old_sum_of_weights=sum_of_weights sum_of_weights=sum_of_weights+weight(k)

Ideal(k, t)=scale_factor*host_rate*(t-$t_0$)*weight(k)/ sum_of_weights

Actual(k, t)=0

For connections that are already in the active state, the ideal number of packets for each connection may be updated as follows:

Ideal (j, t)=Ideal (j, t)*sum_of_weights/old_sum_of_ weights

Similar updates may be performed when a connections leaves an active state, except that weight(k) is subtracted from the sum_of_weights parameter to determine the new sum_of_weights parameter.

Although the foregoing process may handle reallocation of the host-level transmission rate among the plurality of connections in response to a connection entering or leaving an active state, the size of the congestion window (which determines the number of unacknowledged data packets that may be transmitted over a connection) and the size of the sender advertised window (which enables the receiver to determine the size of the buffer for the connection) may also need to be adjusted in order to enable the sender to transmit additional packets over the connection and to enable the receiver to increase the size of the buffer to receive packets over the connection. In other words, because the host-level transmission rate may have been reallocated proportional to the weight of each connection, it may be advantageous to recompute the size of the congestion window and advertised window so that the size of these windows are also proportional to the weight of each connection.

Figure 8:
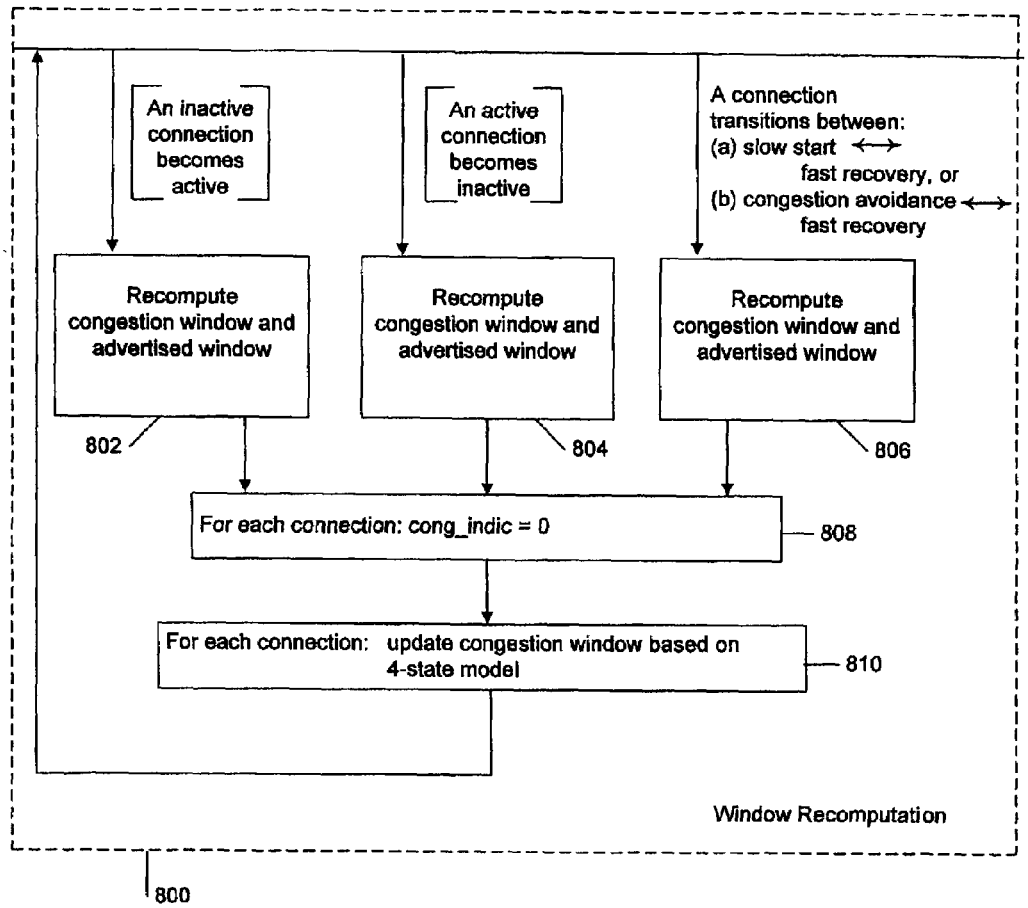
FIG. 8 illustrates an exemplary process for recomputing the size of the congestion window and advertised window in accordance with an embodiment of the present invention.

Referring to FIG. 8, an exemplary process for recomputing the size of the congestion window and advertised window in accordance with an embodiment of the present invention is illustrated generally at 800. As illustrated, recomputation of the congestion window and advertised window is performed in response to the following trigger events: (a) a connection transitioning from an inactive state to an active state, (b) a connection transitioning from an inactive state to an active state, (c) a connection transitioning between slow start and fast recovery, and (d) a connection transitioning between congestion avoidance and fast recovery. The smoothed round trip time may also need to be adjusted in order to account for the change in network conditions that prompted the trigger event. For example, if any of the foregoing trigger events occurs, the congestion window (snd_cwnd) and advertised window (snd_adv_wnd) for the affected connection may be recomputed at steps 802, 804 and 806 in accordance with the following algorithm:

tmp_srtt=min(min_srtt*3, max(host_srtt, srtt));

snd_cwnd=min([weight/sum_of_weights]* host_rate*tmp_srtt/tcp_mss, min _win_per_ con);

snd_adv_wnd=max (snd_adv_wnd, snd_cwnd));

where min_win_per_con is a configurable parameter that may have a range between 1 and 3, min_srtt is the minimum smoothed round trip time observed among all connections to the same host during the lifetime of the host-level statistics, host_srtt is the then-current smoothed round trip time for all connections to the same host, srtt is the then-current smoothed round trip time for the affected connection, and tcp_mss is the maximum segment size of the connection.

The recomputation process may also reset the cong_indic for the affected connection to a value of "0" in order to force the four-state model for that connection into a post reduction state (illustrated as state 0 (508) in FIG. 4) after recomputation. The recomputation process may also store the values of the congestion window and smoothed round trip time prior to recomputation so that the update function may use these parameters to determine whether a congestion condition has occurred.

Figure 9:
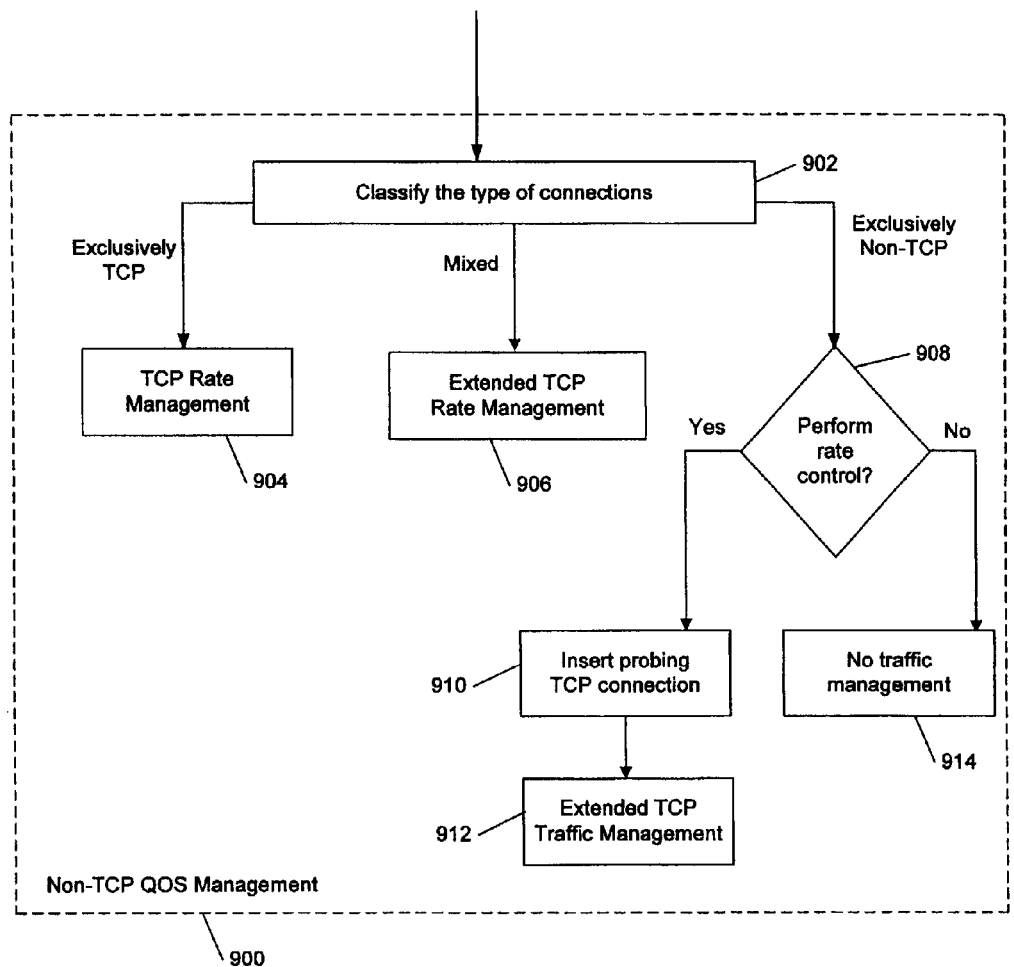
FIG. 9 illustrates an exemplary process for managing TCP and non-TCP connections in accordance with an embodiment of the present invention.

Although the embodiments of the present invention described above are particularly suited for managing TCP data flows, additional embodiments of the present invention may also be configured to manage non-TCP data flows, such as UDP data flows, or a combination of TCP and non-TCP data flows to the same host. Referring to FIG. 9, an exemplary process for managing TCP and non-TCP data flows in accordance with an embodiment of the present invention is illustrated generally at 900. As illustrated, this process may involve initially determining whether the connections under examination correspond to TCP or non-TCP data flows at step 902 by, for example, examining the protocol field of the associated packet headers. If the connections correspond exclusively to TCP data flows, then these connections may be managed at step 904 in accordance with the embodiments described above. If the connections include a mixture of TCP and non-TCP data flows, then these connections may be controlled in accordance with an extended form of TCP rate management. In this context, it is useful to understand the non-TCP connections are typically given super-priority over TCP connections, with data packets associated with non-TCP connections being transmitted at the earliest opportunity. This approach to handling non-TCP connections, however, may lead to non-TCP connections monopolizing the available bandwidth of the downlink channel, thereby causing TCP connections to adapt to the lower perceived bandwidth left over after the non-TCP connection have been served. As a result, this approach can lead to severe deterioration of TCP throughput.

According to the extended form of TCP rate management of the present invention, the rate of non-TCP connections to a given host are tied to the host-level rate for TCP connections, so that non-TCP connections cannot interfere with TCP connections. In this context, the TCP connections are used to determine the host-level transmission rate and adaptively adjust the host-level transmission rate to network congestion. The host-level transmission rate may then be applied to both TCP and non-TCP connections. For example, the scheduler described above with respect to FIG. 7 may be used to schedule packets associated with TCP connections and non-TCP connections based on the ideal and actual number of data packets transmitted over each connection within each round. However, the host-level transmission rate used to determine timing of transmissions may be adjusted to account for non-TCP connections in accordance with the following formula:

$$\text{host\_rate} = (1+K) * \text{host\_rate\_over\_tcp\_flows}, \quad (6)$$

where K equals the sum of the weights for non-TCP connections divided by the sum of the weights for TCP connections. Equation (6) essentially scales up the host-level transmission rate in proportion to the net offered host-level transmission rate for TCP connections. Because the transmission rate for non-TCP connections are tied to the rate for TCP connections, the transmission rates for both types of connections will proportionally increase and decrease in response to the results of TCP congestion control as described above, thereby extending quality of service management over TCP and non-TCP connections.

If step 902 determines that all connections to a given host correspond to non-TCP connections, a determination is made whether or not to perform rate control for these connections at step 908. If not, the conventional approach for handling non-TCP connections is performed at step 914. If so, a form of extended TCP rate control may be performed by inserting a low weight dummy TCP connection to the host that can be used to determine a host-level transmission rate at step 910. The extended TCP rate management process described above for mixed TCP and non-TCP connections may then be performed on the dummy TCP connection and the non-TCP connections in order to provide weight-based rate control of exclusively non-TCP connections.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for managing a plurality of connections between a sender and a receiver within a network communication system, the method comprising:
    determining a current transmission rate for each of the plurality of connections;
    calculating a host-level transmission rate by summing the current transmission rates associated with the plurality of connections;
    allocating the host-level transmission rate among the plurality of connections based on a ratio of a weight associated with each connection and a sum of the weights for the plurality of connections;
    selecting data packets for transmission such that each selected data packet is associated with the connection having a highest difference between the allocated transmission rate and an actual transmission rate for the connection, the actual transmission rate being determined from the number of selected data packets transmitted over the connection over a predetermined time period; and
    transmitting the selected data packets from the sender over the associated connections in response to each expiration of a transmission timer, the period of the transmission timer having a period corresponding to the host-level transmission rate.

2. The method of claim 1, wherein the step of determining comprises measuring a roundtrip time and a congestion window parameter for each of the plurality of connections.

3. The method of claim 2, wherein the step of determining further comprises calculating a smoothed round trip time and a smoothed congestion window for each of the plurality of connections based on a plurality of samples of the measured round trip time and the measured congestion window parameter, respectively.

4. The method of claim 3, wherein the step of determining comprises taking a ratio of the smoothed round trip time and the smoothed congestion window to determine the current transmission rate.

5. The method of claim 1, further comprising the steps of:
    periodically updating the current transmission rate for each of the plurality of connections to update the host-level transmission rate; and
    re-allocating the host-level transmission rate among the plurality of connection using the updated host-level transmission rate.

6. The method of claim 5, wherein the step of periodically updating comprises adjusting the congestion window parameter associated with the connection over which the selected data packet was transmitted in response to receipt of an acknowledgement for the selected data packet.

7. The method of claim 6, wherein the step of periodically updating comprises incrementing the congestion window parameter in response to receipt of the acknowledgement.

8. The method of claim 6, wherein the step of periodically updating comprises reducing the congesting window parameter in response to the sum of the change in congestion window parameters exceeding a predetermined threshold.

9. The method of claim 1, further comprising the step of adjusting the allocated transmission rate for each of the plurality of connections in response to one of the plurality of connections transitioning from an active state to an inactive state.

10. The method of claim 1, further comprising the step of adjusting the allocated transmission rate for each of the plurality of connections in response to one of the plurality of connections transitioning from an inactive state to an active state.

11. The method of claim 1, wherein the step of allocating is performed such that the allocated transmission rate for each connection equals the host-level transmission rate multiplied by the respective ratio for each connection.

12. The method of claim 1, further comprising adjusting the host-level transmission rate to account for additional connections between the sender and receiver for which the current transmission rate cannot be determined based on a ratio of the weights assigned to the additional connections and the weights assigned to the plurality of connections for which the current transmission rate can be determined.

13. A method for managing a plurality of connection between a sender and a receiver, the method comprising:

determining a host-level transmission rate between the sender and receiver by summing a current transmission rate associated with each of the plurality of connections;

allocating the host-level transmission rate among the plurality of connections based on a ratio of a weight associated with each connection and a sum of the weights for the plurality of connections; and selectively transmitting data packets from the sender over associated ones of the plurality of connections such that data packets associated with connections having a highest difference between the allocated transmission rate and an actual transmission rate are transmitted first, each data packet being transmitted from the sender in response to each expiration of a transmission timer having a period corresponding to the host-level transmission rate.

14. The method of claim 13, wherein the step of determining comprises taking a ratio of a smoothed round trip time and a smoothed congestion window for each connection to determine the current transmission rate for each connection.

15. The method of claim 13, further comprising the steps of:

periodically updating the current transmission rate for each of the plurality of connections to update the host-level transmission rate; and re-allocating the host-level transmission rate among the plurality of connection using the updated host-level transmission rate.

16. The method of claim 15, wherein the step of periodically updating comprises adjusting the congestion window parameter associated with the connection over which the selected data packet was transmitted in response to receipt of an acknowledgement for the selected data packet.

17. The method of claim 16, wherein the step of periodically updating comprises incrementing the congestion window parameter in response to receipt of the acknowledgement.

18. The method of claim 16, wherein the step of periodically updating comprises reducing the congesting window parameter in response to the sum of the change in congestion window parameters for the plurality of connections exceeding a predetermined threshold.

19. The method of claim 13, further comprising the step of adjusting the allocated transmission rate for each of the plurality of connections in response to one of the plurality of connections transitioning from an active state to an inactive state.

20. The method of claim 13, further comprising the step of adjusting the allocated transmission rate for each of the plurality of connections in response to one of the plurality of connections transitioning from an inactive state to an active state.

21. The method of claim 13, wherein the step of allocating is performed such that the allocated transmission rate for each connection equals the host-level transmission rate multiplied by the respective ratio for each connection.

22. The method of claim 13, further comprising adjusting the host-level transmission rate to account for additional connections between the sender and receiver for which the current transmission rate cannot be determined based on a ratio of the weights assigned to the additional connections and the weights assigned to the plurality of connections for which the current transmission rate can be determined.

23. A system for managing a plurality of connections between a sender and a receiver within a network communication system, the system comprising:

a processor; and a memory unit, operably coupled to the processor, for storing instructions which when executed by the processor cause the processor to operate so as to:

determine a current transmission rate for each of the plurality of connections;

calculate a host-level transmission rate by summing the current transmission rates associated with the plurality of connections;

allocate the host-level transmission rate among the plurality of connections based on a ratio of a weight associated with each connection and a sum of the weights for the plurality of connections;

select data packets for transmission such that each selected data packet is associated with the connection having a highest difference between the allocated transmission rate and an actual transmission rate for the connection, the actual transmission rate being determined from the number of selected data packets transmitted over the connection over a predetermined time period; and transmit the selected data packets from the sender over the associated connections in response to each expiration of a transmission timer, the period of the transmission timer having a period corresponding to the host-level transmission rate.

24. A system for managing a plurality of connections between a sender and a receiver, the system comprising:
a processor; and
a memory unit, operably coupled to the processor, for storing instructions which when executed by the processor cause the processor to operate so as to:
determine a host-level transmission rate between the sender and receiver by summing a current transmission rate associated with each of the plurality of connections;
allocate the host-level transmission rate among the plurality of connections based on a ratio of a weight associated with each connection and a sum of the weights for the plurality of connections; and
selectively transmit data packets from the sender over associated ones of the plurality of connections such that data packets associated with connections having a highest difference between the allocated transmission rate and an actual transmission rate are transmitted first, each data packet being transmitted from the sender in response to each expiration of a transmission timer having a period corresponding to the host-level transmission rate.

* * * * *